(12) United States Patent
Kennedy (10) Patent No.: US 7,011,080 B2
(45) Date of Patent: Mar. 14, 2006

(54) WORKING FLUID CIRCUIT FOR A TURBOCHARGED ENGINE HAVING EXHAUST GAS RECIRCULATION

(75) Inventor: Lawrence C. Kennedy, Bingham Farms, MI (US)

(73) Assignee: Detroit Diesel Corporation, Detroit, MI (US)

( * ) Notice: Subject to any disclaimer, the term of this patent is extended or adjusted under 35 U.S.C. 154(b) by 28 days.

(21) Appl. No.: 10/929,212

(22) Filed: Aug. 30, 2004

(65) Prior Publication Data

US 2005/0056263 A1    Mar. 17, 2005

Related U.S. Application Data (63) Continuation-in-part of application No. 10/177,216, filed on Jun. 21, 2002, now Pat. No. 6,786,210.

(51) Int. Cl.
*F02M 25/07* (2006.01)
*F02B 29/04* (2006.01)

(52) U.S. Cl. ............... 123/568.12; 123/568.2; 60/599; 60/605.2

(58) Field of Classification Search ........... 123/348.11, 123/568.12, 568.16, 568.2, 568.21, 563; 80/599, 605.2; 165/103, 283, 297
See application file for complete search history.

(56) References Cited

U.S. PATENT DOCUMENTS

| | | | |
|---|---|---|---|
| 3,996,748 A | 12/1976 | Melchior | ............... 60/614 |
| 4,179,892 A | 12/1979 | Heydrich | ............ 60/605.2 |
| 5,517,976 A | 5/1996 | Bachle et al. | .......... 123/568.12 |
| 5,592,925 A * | 1/1997 | Machida et al. | ....... 123/568.11 |
| 5,607,010 A | 3/1997 | Schonfeld et al. | ............ 165/51 |
| 5,611,204 A | 3/1997 | Radovanovic et al. | ..... 60/605.2 |
| 5,617,726 A | 4/1997 | Sheridan et al. | ........... 60/605.2 |
| 5,657,630 A | 8/1997 | Kjemtrup et al. | .......... 60/605.2 |
| 5,732,688 A * | 3/1998 | Charlton et al. | ....... 123/568.12 |
| 6,116,026 A | 9/2000 | Freese | ...................... 60/605.2 |
| 6,161,528 A * | 12/2000 | Akao et al. | ............ 123/568.12 |
| 6,216,458 B1 | 4/2001 | Alger et al. | ............... 60/605.2 |

(Continued)

FOREIGN PATENT DOCUMENTS

EP    0 656 467 A1    6/1995

(Continued)

*Primary Examiner*—Willis R. Wolfe, Jr.
(74) *Attorney, Agent, or Firm*—Bliss McGlynn, P.C.

(57) ABSTRACT

An engine working fluid circuit for a turbocharged internal combustion engine that employs exhaust gas recirculation. The working fluid circuit includes an exhaust gas passage, a charge air passage, and a turbocharger operatively driven by the exhaust gas flowing from the internal combustion engine and acting to provide pressurized air to the charged air passage. An exhaust gas recirculation passage extends between the exhaust gas passage and the charge air passage bypassing the turbo charger and providing a path for recirculating a predetermined amount of exhaust gas into the charge air. A single charge air cooler is also included that has a first manifold assembly, a second manifold assembly, and a plurality of cooling passages disposed therebetween. The cooling passages act to cool the mixed charge air and recirculated exhaust gas prior to induction into the internal combustion engine. A flow valve is operatively disposed between the first manifold assembly and the second manifold assembly, and is movable between open, bypass, and reverse positions to control the flow of the mixed charge air and recirculated exhaust gas through the cooler. The open position provides forward flow through the cooling passages; the bypass position provides flow that bypasses the cooling passages; and the reverse position provides a reverse cleaning flow through the cooling passages.

8 Claims, 4 Drawing Sheets

U.S. PATENT DOCUMENTS

| | | | |
|---|---|---|---|
| 6,230,695 B1 | 5/2001 | Coleman et al. | 123/568.12 |
| 6,253,837 B1 * | 7/2001 | Seiler et al. | 165/103 |
| 6,267,106 B1 | 7/2001 | Feucht | 123/568.12 |
| 6,305,167 B1 | 10/2001 | Weisman, II et al. | 60/602 |
| 6,324,846 B1 | 12/2001 | Clarke | 60/605.2 |
| 6,367,256 B1 | 4/2002 | McKee | 60/605.2 |
| 6,513,484 B1 | 2/2003 | Buckland et al. | 123/568.12 |
| 6,598,396 B1 * | 7/2003 | Bailey | 60/605.2 |
| 6,786,210 B1 * | 9/2004 | Kennedy et al. | 123/568.12 |
| 2003/0150434 A1 | 8/2003 | Leedham et al. | 123/568.12 |

FOREIGN PATENT DOCUMENTS

| | | |
|---|---|---|
| JP | 6246194 | 2/1987 |
| JP | 7034983 | 2/1995 |
| JP | 7071329 | 3/1995 |
| JP | 9256915 | 9/1997 |

* cited by examiner

WORKING FLUID CIRCUIT FOR A TURBOCHARGED ENGINE HAVING EXHAUST GAS RECIRCULATION

This application is a continuation-in-part of U.S. Ser. No. 10/177,216, entitled Working Fluid Circuit For A Turbocharged Engine Having Exhaust Gas Recirculation filed Jun. 21, 2002, now U.S. Pat. No. 6,786,210.

BACKGROUND OF THE INVENTION

1. Field of the Invention

The invention relates, generally, to a working fluid circuit for an internal combustion engine, and more specifically, to a fluid circuit for a turbocharged internal combustion engine that employs exhaust gas recirculation.

2. Description of the Related Art

Exhaust gas recirculation is commonly employed in connection with internal combustion engines as a means for controlling the generation of oxides of Nitrogen ($NO_x$) generated during the operation of the engine. This involves the recirculation of exhaust gas byproducts, typically taken from the exhaust manifold, and routed into the intake air supply of the engine. The exhaust gas reintroduced into the engine cylinder in this way reduces the concentration of oxygen in the fuel/air mixture. A reduction of oxygen in the fuel/air mixture results in a lower maximum combustion temperature and slows the chemical reaction of the combustion process. This decreases the formation of nitrous oxides ($NO_x$) that are discharged from the engine. In addition, the exhaust gases often contain a portion of unburned hydrocarbon that, left uncombusted, forms a part of the exhaust emissions generated during the operation of any given internal combustion engine. However, when the unburned hydrocarbons are recirculated back to the combustion chamber, they are burned thereby further reducing the emission of undesirable exhaust gas byproducts from the engine. In view of the benefits derived by employing this technique, exhaust gas recirculation is commonly found in connection with both spark ignition and compression ignition (diesel) engines. Exhaust gas recirculation is particularly useful in connection with internal combustion engines used in motor vehicles, such as passenger cars, light duty trucks, and other motorized equipment.

Turbochargers are also known to be used in the related art to provide charge air to the working fluid circuit of an engine. More specifically, when an engine is turbocharged, the pressurized exhaust gas acts on a turbine that, in turn, drives a compressor. The compressor pressurizes the intake air for the internal combustion engine making it denser. Dense intake air improves combustion resulting in increased power from the engine. Turbochargers are employed in connection with both spark ignition and compression ignition (diesel) engines for this purpose.

In addition to recirculating the exhaust gases, it is also known in the related art that lowering intake manifold temperatures reduces the formation of nitrous oxides generated as a product of combustion. However, the exhaust gases that are available for recirculation are generally very hot, sometimes exceeding 550° C. Thus, it is known in the art to cool the recirculated exhaust gas in order to lower the intake air temperature thereby further reducing the production of $NO_x$ where exhaust gas recirculation is employed. In addition, it is also known to cool the charge air delivered by the turbocharger prior to induction into the combustion chamber. The EGR intercooler and charge air cooler are separate heat exchangers that are employed to cool these two engine working fluids. One example of a turbocharged internal combustion engine having intercooled exhaust gas recirculation is found in U.S. Pat. No. 6,116,026, issued Sep. 12, 2000 and assigned to the assignee of the present invention. The disclosure of this patent is incorporated herewith.

In turbocharged internal combustion engines, the exhaust gas to be recirculated is generally removed upstream of the turbine, routed through the intercooler, and then reintroduced into the intake air stream downstream of the compressor and the charge air cooler. Exhaust gas intercoolers of this type often employ engine coolant as the cooling medium. While these coolers have generally worked for their intended purpose in the past, disadvantages still remain. More specifically, using the engine coolant as the cooling medium increases the heat load on the engine cooling system and thereby necessitates larger vehicles radiators. The use of multiple or staged coolers has also been suggested in the prior art, but this only adds to the bulk of the engine and tends to overcomplicate the engine cooling system. Furthermore, the extreme temperature differentials that exist between the exhaust gas and the coolant in the intercooler creates a harsh working environment. Some products of combustion found in the exhaust gas are highly corrosive and can condense at certain operating temperatures within the intercooler. These harsh operating environments and corrosive condensate can cause the liquid to air intercoolers to leak over time.

In response to these shortcomings, advances in the art have been made toward developing engine working fluid circuits that are capable of cooling both the recirculated exhaust gas and the charge air without the addition of multiple coolers. Additionally, these latest engine working fluid circuits have been directed at cooling the recirculated exhaust gas and charge air using an air-to-air interchanger rather than the typical liquid/air cooling interface. While these newer approaches have generally worked for their intended purposes, other drawbacks have become apparent. More specifically, the newer fluid circuits employing air-to-air exchangers must still pass the corrosive combustion by-products inherent in the EGR recirculation. While much more efficient in this process, it has been found that the EGR gases still cause a build-up of material in the transfer passages of the air-to-air exchangers, ultimately fouling the passages. These particulate materials are various types of soot and corrosive by-products of combustion that collect in the passages of the exchanger and become more troublesome when operating conditions cause condensation to form as well.

Accordingly, there remains a need in the art for an engine working fluid circuit that cools both the EGR gasses and the charge air in a single air-to air exchanger and has the ability to clean out the soot and combustion by-products that accumulate during the operation of the circuit. Additionally, there remains a need in the art for an engine working fluid circuit that has the ability to compensate for operating periods where condensation forms within the exchanger improving system reliability.

SUMMARY OF INVENTION AND ADVANTAGES

The present invention overcomes the disadvantages of the related art in a working fluid circuit for a turbocharged internal combustion engine that employs exhaust gas recirculation. The working fluid circuit includes an exhaust gas passage, a charge air passage, and a turbo charger operatively driven by the exhaust gas flowing from the internal combustion engine and acting to provide pressurized air to the charged air passage. An exhaust gas recirculation passage extends between the exhaust gas passage and the charge air passage bypassing the turbo charger and providing a path for recirculating a predetermined amount of exhaust gas into the charge air. A single charge air cooler is also included that has a first manifold assembly, a second manifold assembly, and a plurality of cooling passages disposed therebetween. The cooling passages act to cool the mixed charge air and recirculated exhaust gas prior to induction into the internal combustion engine. A flow valve is operatively disposed between the first manifold assembly and the second manifold assembly and is movable between open, bypass, and reverse positions to control the flow of the mixed charge air and recirculated exhaust gas through the cooler. The open position provides forward flow through the cooling passages, the bypass position provides flow that bypasses the cooling passages, and the reverse position provides a reverse cleaning flow through the cooling passages.

Thus, the working fluid circuit of the present invention overcomes the drawbacks of the prior art by providing cooling of both the recirculated exhaust gas and the charge air without the addition of multiple coolers. It also has a bypass and reverse flow capability through the cooling passages that acts to a clean out the combustion by-products and assists in the removal of condensation within the cooler.

BRIEF DESCRIPTION OF THE DRAWINGS

Other advantages of the invention will be readily appreciated, as the same becomes better understood by reference to the following detailed description when considered in connection with the accompanying drawings, wherein.

DETAILED DESCRIPTION OF THE PREFERRED EMBODIMENT(S)

Figure 1:
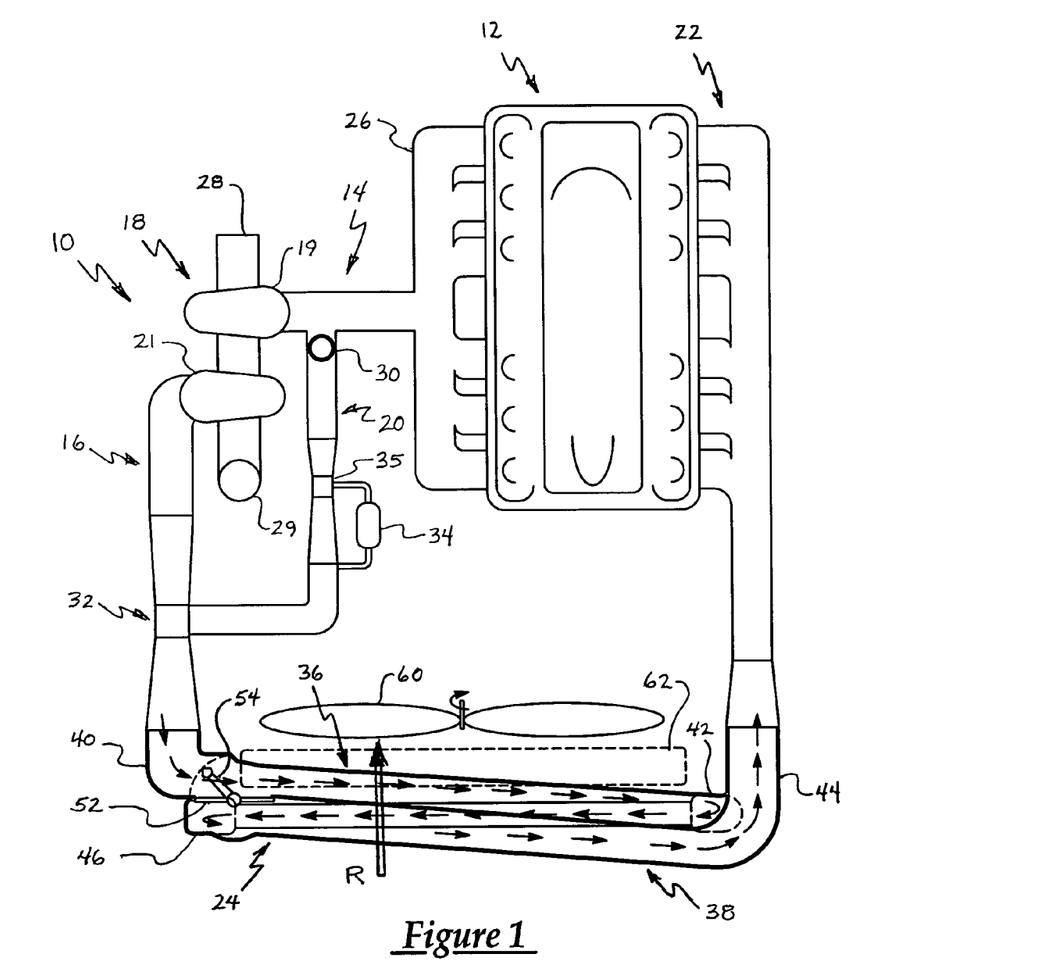
FIG. 1 is a schematic view of the working fluid circuit of the present invention.

Referring now to the figures where like numerals are used to designate like structure throughout the drawings, a working fluid circuit for a turbocharged internal combustion engine that employs exhaust gas recirculation is generally indicated at 10 in FIG. 1. The internal combustion engine is generally indicated at 12 and may include one or more combustion chambers that are arranged in any convenient manner such as inline or in a V-shaped configuration. Thus, the engine working fluid circuit 10 of the present invention may be employed in conjunction with an internal combustion engine having a straight 4, straight 6, V-6, V-8, V-12 cylinder arrangements, or the like. Furthermore, those having ordinary skill in the art will appreciate that the number and particular arrangement of the combustion chambers of the internal combustion engine 12 form no part of the present invention. The internal combustion engine 12 may be either a spark ignition or a compression ignition (diesel) engine. However, in the preferred embodiment contemplated by the inventors herein, the working fluid circuit 10 of the present invention is particularly adapted for use with a diesel engine.

The working fluid circuit 10 includes an exhaust gas passage, generally indicated at 14. The exhaust gas passage is in fluid communication with the combustion chambers of the internal combustion engine 12. Accordingly, exhaust gas under pressure flows from the internal combustion engine 12 through the exhaust gas passage 14. The working fluid circuit 10 further includes a charge air passage, generally indicated at 16, and a turbocharger, generally indicated at 18, that is operatively driven by the exhaust gas flowing from the internal combustion engine 12. The turbocharger 18 acts to provide pressurized air to the charge air passage 16 as will be discussed in greater detail below.

An exhaust gas recirculation passage is generally indicated at 20 and extends between the exhaust gas passage 14 and the charge air passage 16. Furthermore, the exhaust gas recirculation passage 20 bypasses the turbocharger 18 and provides a path for recirculating a predetermined amount of exhaust gas into the charge air passage 16 so as to add mix the exhaust gas and the charge air. The working fluid circuit 10 of the present invention also includes an intake passage 22 that provides intake air to the internal combustion engine 12. In addition, the working fluid circuit 10 includes a single charge air cooler, generally indicated at 24. The single charge air cooler 24 is operatively interconnected to, and provides fluid communication between, the charge air passage 16 and the intake passage 22. The single charge air cooler 24 acts to cool the mixed charge air and recirculated exhaust gas prior to induction into the internal combustion engine 12 through the intake passage 22 as will be described in greater detail below.

In the preferred embodiment, the exhaust gas passage 14 may include an exhaust manifold 26. The exhaust manifold 26 is operatively connected in fluid communication between the combustion chamber(s) of the engine 12 and the turbocharger 18. The turbocharger 18 includes a turbine 19 and a compressor 21 as is commonly known in the art. Pressurized exhaust gas acts on the turbine 19, which, in turn, then drives the compressor 21. The compressor pressurizes intake air supplied to the turbocharger 18 at, for example, 29 to produce pressurized charge air. The charge air is delivered to the charge air passage 16 as noted above. The high-pressure exhaust gas used to drive the turbine 19 is vented to the atmosphere as representatively shown at 28.

An exhaust gas recirculation (EGR) valve 30 may be operatively disposed in the exhaust gas recirculation passage 20. The EGR valve 30 acts to control the flow of exhaust gas from the exhaust manifold 26 into the charge air passage 16 but bypassing the turbocharger 18. The EGR valve 30, in turn, is controlled by a central engine controller (not shown) in response to predetermined engine operating parameters.

To promote exhaust gas recirculation, backpressure is sometimes applied at the turbine outlet. A variable nozzle turbine (VNT) turbocharger may be employed for this purpose. In this case, a nozzle or vanes are closed in response to a command from the engine control module. A venturi, generally indicated at 32, may also be used to promote exhaust gas recirculation. The venturi 32 is defined at the fluid connection between the charge air passage 16 and the exhaust gas recirculation passage 20. The venturi 32 assists in drawing flow from the exhaust gas recirculation passage 20 into the charge air passage 16. In addition, a flow measurement sensor 34 may be disposed between the EGR valve 30 and the charge air passage 16 to sense the flow of exhaust gas through the exhaust gas recirculation passage 20. The flow measurement sensor 34 may be of any suitable type, including, for example, (1) of the differential pressure measurement type, employing a venturi and pressure sensor or (2) a hot wire anemometer device to measure airflow.

In the preferred embodiment, the mass air/flow ratio of charge air to recirculated exhaust gas flowing through the charge air passage 16 may be a predetermined value. Thus, in one non-limiting example, the intake air provided from the compressor 21 of the turbocharger 18 may have a mass air/flow of 35 kg/min. at 251° C. On the other hand, the mass air/flow of recirculated exhaust gas may be 5.8 kg/min. at 594° C. Mixing the recirculated exhaust gas with the charge air raises the temperature of the intake air that flows to the combustion chambers of the internal combustion engine 12 through the intake manifold 22 to undesirable levels. As in this representative example, the mixed charge air and recirculated exhaust gas moving through the charge air passage 16 prior to the single charge air cooler 24 would have a mass air/flow of 40.8 kg/min. at 312° C. Accordingly, this mixed charge air and recirculated exhaust gas must be cooled through the single charge air cooler 24 before being passed to the combustion chambers.

Figure 2A:
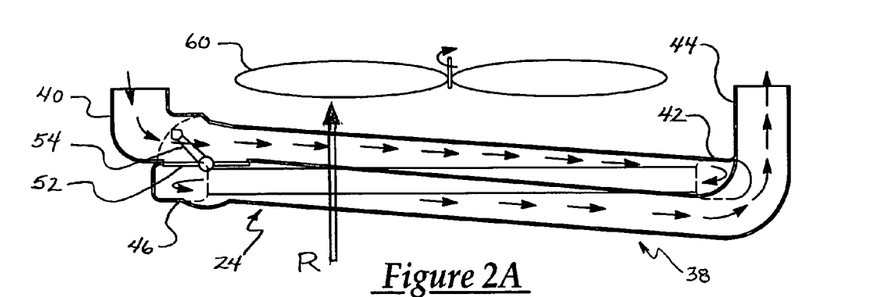
FIG. 2A is a schematic cross-sectional top view of the single charge air cooler of the present invention in the forward flow mode.
Figure 2B:
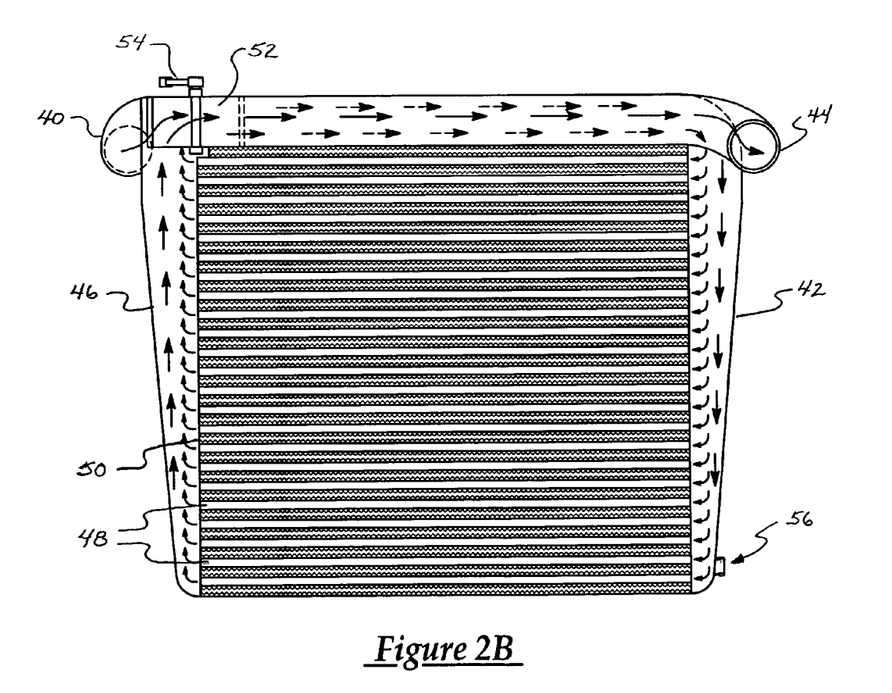
FIG. 2B is a schematic cross-sectional front view of the single charge air cooler of the present invention in the forward flow mode.
Figure 3A:
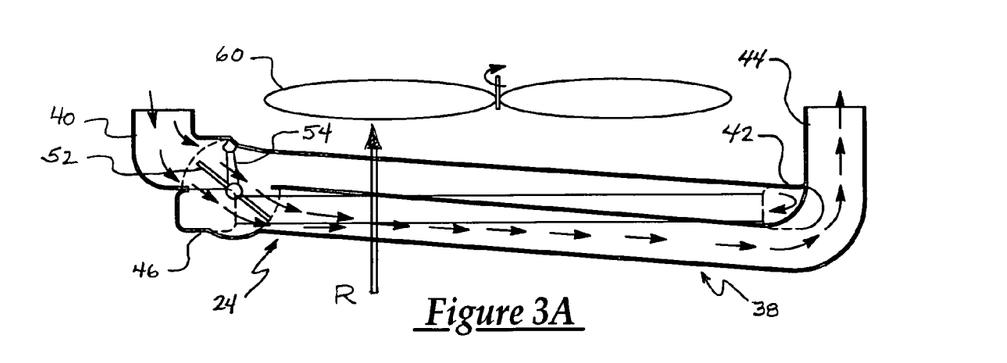
FIG. 3A is a schematic cross-sectional top view of the single charge air cooler of the present invention in the bypass flow mode.
Figure 3B:
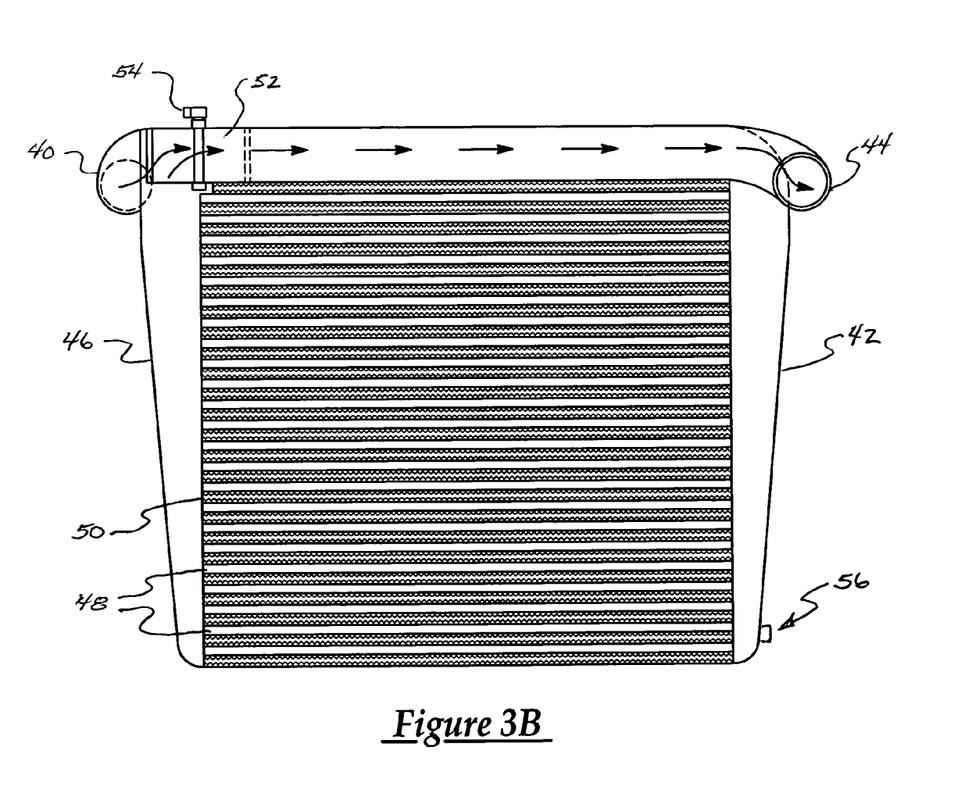
FIG. 3B is a schematic cross-sectional front view of the single charge air cooler of the present invention in the bypass flow mode.
Figure 4A:
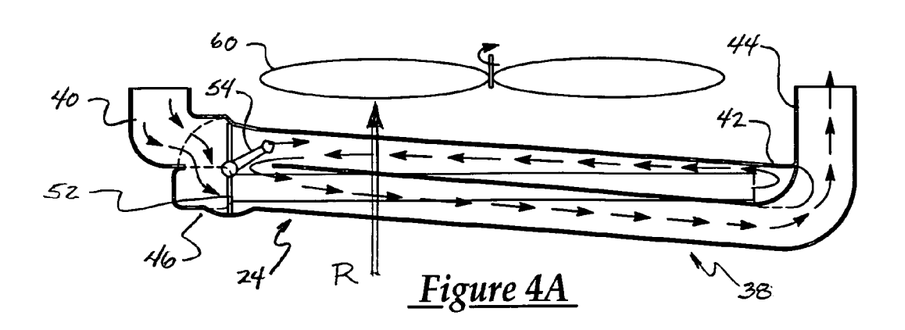
FIG. 4A is a schematic cross-sectional top view of the single charge air cooler of the present invention in the reverse flow mode.
Figure 4B:
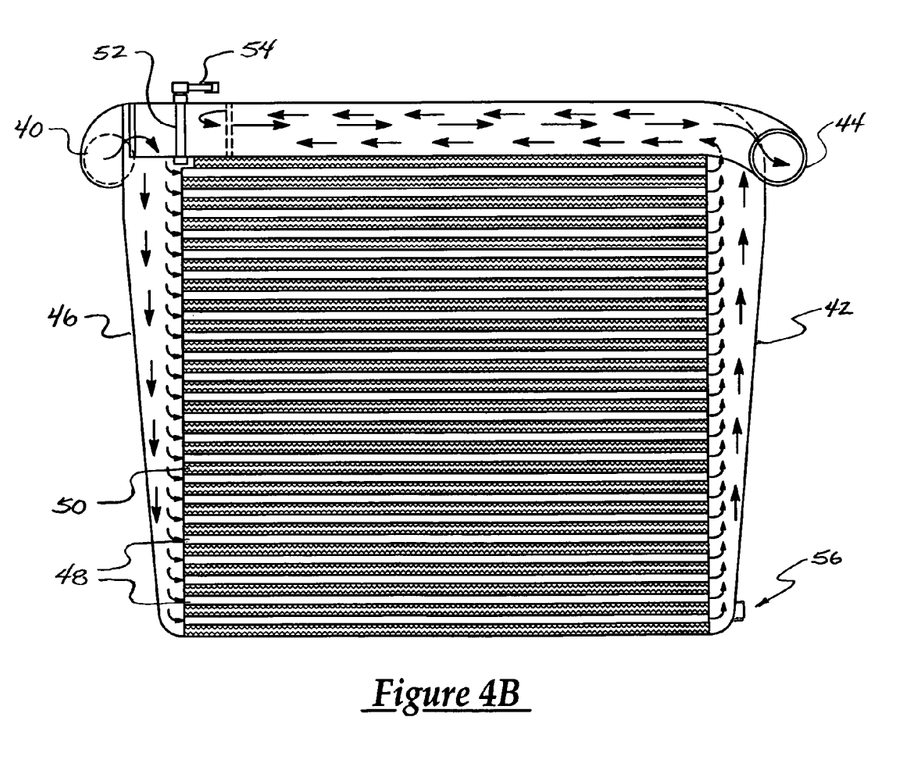
FIG. 4B is a schematic cross-sectional front view of the single charge air cooler of the present invention in the reverse flow mode.

To this end, the single charge air cooler generally indicated at 24 includes an first manifold assembly generally indicted at 36 and in fluid communication with the charge air passage 16 and a second manifold assembly generally indicated at 38 and in fluid communication with the intake passage 22 for the internal combustion engine 12. As best shown in FIGS. 2A, 3A, and 4A, the first manifold assembly 36 includes a first pipe 40 and a first manifold 42. Similarly, the second manifold assembly 38 includes a second pipe 44 and a second manifold 46. As shown in FIGS. 2B, 3B, and 4B, a plurality of cooling passages 48 extend between the first manifold assembly 36 and the second manifold assembly 38 of the single charge air cooler 24. More specifically, these cooling passages 48 extend between the first manifold 42 and the second manifold 46. The cooling passages 48 are spaced from one another so that ram air, generally indicated by the arrow "R" in FIG. 1, may flow over these passages 48 and through cooling fins 50. In addition to this ram air, a fan 60 powered by the internal combustion engine 12 may be employed to draw air across the cooling passages 48. In this way, the cooling passages 48 provide a path for the mixed charge air and recirculated exhaust gas through the single charge air cooler 24 thereby cooling it. It should be appreciated that the working fluid circuit 10 of the present invention will most likely be installed in a vehicle having a liquid media cooling system for the engine 12. When this is the case, as shown in FIG. 1, a radiator type heat exchanger, shown in phantom at 62 will be installed in the ram airflow jointly with the cooler 24. Empirical determinations have shown that a greater cooling effect to both the cooler 24 and the radiator 62 occurs when the cooler 24 is mounted forward of the radiator 62. Thus, although the radiator 62 may be mounted before the cooler 24 in the ram airflow, it is preferable to mount the cooler 24 forward of the radiator 62, as shown.

The single charge air cooler 24 further includes a flow valve 52 operatively disposed between the first manifold assembly 36 and the second manifold assembly 38. More specifically, the flow valve 52 is disposed between the first and second pipes 40 and 44 as they are mounted across the top of the cooler 24,juxtaposed to one another. The flow valve 52 is movable between forward, bypass, and reverse positions to control the flow of the mixed charge air and recirculated exhaust gas through the cooler 24. As shown in FIGS. 1 through 2B, the forward position of the valve 52 provides forward flow through the cooling passages 48. The forward flow as illustrated is the full cooling mode in which the control valve 52 directs all of the mixed charge air and EGR gas through the first pipe 40 down into the first manifold 42 which further distributes the flow through the cooling passages 48 from right to left, as illustrated in the Figures. The flow is cooled by the ram air as it flows through the cooling passages 48 and into the second manifold 46. The flow then passes through the second pipe 44 and enters the intake passage 22.

As best shown in FIGS. 3A and 3B, the bypass position of the valve 52 provides flow that moves between the first and second pipes 40 and 44 and bypasses the cooling passages 48. FIG. 3A depicts how the flow valve 52 opens to a point such that the mixed charge air and recirculated exhaust gas move directly from the first pipe 40 to the second pipe 44 without entering the first manifold 42 and crossing through the cooling passages 48. This presents the intake passage 22 and the engine 12 with uncooled mixed charge air and recirculated exhaust gas as may be necessary under certain predetermined conditions. It should be appreciated that the flow control valve 52 is operable by a control arm 54 under the selective control of an actuating device (not shown) and a control device or circuit (also not shown). For example, the control device may by an engine control unit (ECU) or another like control that uses a stored or programmed control method to operate the flow control valve 52 of the present invention. The actuating device may be an electrically operated and controlled solenoid. Regardless, these control devices and the predeterminations as to how to operate the flow control valve 52 are beyond the scope of this invention and as such are not included in this discussion. It should be further appreciated that under normal operating conditions the position of the flow control valve 52 will be varied between the forward and bypass positions so that the output temperature of the mixed charge air and recirculated exhaust gas can be controlled as warranted by operating conditions. More specifically, at certain times ambient air conditions in concert with engine temperatures and air intake demands will cause condensation to occur in the cooler 24. As mentioned above, due to the corrosive content of the exhaust gas, such condensate can lead to corrosion in the cooler where condensation occurs. The negative effects of this is an undesirable condition can be overcome by the selective movement of the flow control valve 52 to a position of greater flow bypass which will subsequently raise the mixed charge air and recirculated exhaust gas temperature thereby preventing or removing the condensation.

Additionally, as shown in FIGS. 4A and 4B, the reverse position of the valve 52 provides a reverse cleaning flow through the cooling passages 48. With the flow valve 52 in this position, all of the mixed charge air and recirculated exhaust gas is immediately passed into the second manifold 46 and sent across the cooling passages 48, left to right as illustrated in the Figures, to the first manifold through a portion of the first pipe 40 over to the second pipe 44 to the intake passage 22. Thus, the flow across the cooling passages 48 is reversed providing a cleaning flow to remove any accumulated soot and combustion by-product particulates. While the control of the flow valve 52 to provide the reverse flow is likewise beyond the scope of the present invention, it should be understood that the reverse flow may be an integrated part of the operation of the fluid circuit 10. In other words, it should be appreciated that it may be desirable to introduce a reverse flow condition when the engine is at or returns to idle, thereby removing any deposited material from each run up or acceleration of the engine and turbocharger, for example. It may also be desirable to repetitively introduce periods of reverse flow when conditions are such that condensation can form. In this manner the single charge air cooler 24 of the present invention may also include a condensation sensor, generally indicated at 56 and located in the representative embodiment a the lower portion of the cooler 24. The sensor 56 is adapted to detect a presence of condensation in the cooler 24.

In the representative example under consideration herein, the mixed charge air and recirculated exhaust gas that enters the single charge air cooler 24 at approximately 312° C., leaves the cooler 24 via the outlet 38 and passes along the intake manifold 22 at approximately 60° C. At this temperature, the air may be pressurized at this point in the engine working fluid circuit at approximately 332 kPa. However, those having ordinary skill in the art will appreciate that the representative temperatures, mass air flow, and pressures discussed herein are merely illustrative and are not meant to place any operational limitations on the present invention.

In this way, the working fluid circuit of the present invention is capable of cooling both the recirculated exhaust gas and the charge air without the addition of multiple coolers. Furthermore, it can cool the recirculated exhaust gas and charge air without the disadvantages associated with leaks that occur in heat exchangers employing a liquid/air cooling interface. The charge air cooler of the present invention employs a cross flow of ram air to cool the mixed recirculated exhaust gas and charge air in a single pass through the cooler. Thus, the working fluid circuit of the present invention employs an overall simpler cooling strategy, eliminates redundant components, and improves the reliability of the overall system.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

I claim:

1. A single charge air cooler for a turbocharged internal combustion engine that employs exhaust gas recirculation, said single change air cooler comprising:
   a charge air passage for accepting a mix of pressurized air from the turbocharger and recirculated exhaust gas from the engine exhaust;
   an intake passage for providing the mix of pressurized air and recirculated exhaust gas as charged intake air to the engine;
   a first manifold assembly having a first pipe in fluid communication with said charge air passage;
   a second manifold assembly having a second pipe in fluid communication with said intake passage;
   a plurality of cooling passages horizontally disposed and in fluid communication between said first manifold assembly and said second manifold assembly such that said first pipe is operatively mounted along the horizontal length of said cooler in parallel to said cooling passages to provide fluid communication between said charge air passage and said first manifold, said second pipe operatively mounted along the horizontal length of said cooler juxtaposed to said first pipe to provide fluid communication between said intake passage and said second manifold, said cooling passages acting to cool the mix of pressurized air and recirculated exhaust gas prior to induction into the engine; and
   a flow control valve operatively disposed between said first and said second pipes, said flow control valve movable between open, bypass, and reverse positions to control the flow of the mixed charge air and recirculated exhaust gas through said cooler, said open position providing forward flow through said cooling passages, said bypass position providing flow that bypasses said cooling passages, and said reverse position providing a reverse cleaning flow through said cooling passages.

2. An engine working fluid circuit for a turbocharged internal combustion engine that employs exhaust gas recirculation, said working fluid circuit comprising:
   an exhaust gas passage through which exhaust gas under pressure flows from the internal combustion engine, a charge air passage, and a turbo charger operatively driven by the exhaust gas flowing from the internal combustion engine and acting to provide pressurized air to said charged air passage;
   an exhaust gas recirculation passage extending between said exhaust gas passage and said charge air passage bypassing said turbo charger and providing a path for recirculating a predetermined amount of exhaust gas into said charge air passage so as to mix the exhaust gas with the charge air;
   an intake passage for providing intake air to the internal combustion engine;
   a single charge air cooler having a first manifold assembly in fluid communication with said charge air passage, a second manifold assembly in fluid communication with said intake passage, and a plurality of cooling passages disposed therebetween, said cooling passages acting to cool the mixed charge air and recirculated exhaust gas prior to induction into the internal combustion engine; and
   a flow valve operatively disposed between said first manifold assembly and said second manifold assembly, said flow valve movable between open, bypass, and reverse positions to control the flow of the mixed charge air and recirculated exhaust gas through said cooler, said open position providing forward flow through said cooling passages, said bypass position providing flow that bypasses said cooling passages, and said reverse position providing a reverse cleaning flow through said cooling passages.

3. An engine working fluid circuit as set forth in claim 2 wherein said single charge air cooler includes a condensation sensor adapted to detect a build-up of condensation within said cooler.

4. An engine working fluid circuit as set forth in claim 2 wherein said single charge air cooler has said cooling passages mounted horizontally between said first and said second manifold assemblies such that said cooler is of a cross-flow configuration.

5. An engine working fluid circuit as set forth in claim 4 wherein said first manifold assembly further includes a first pipe operatively mounted along the horizontal length of said cooler in parallel to said cooling passages to provide fluid communication between said charge air passage and said first manifold; and wherein said second manifold assembly further includes a second pipe operatively mounted along the horizontal length of said cooler in parallel to said cooling passages, juxtaposed to said first pipe to provide fluid communication between said intake passage and said second manifold such that said flow valve is operatively disposed between said first and said second pipes to selectively control the flow of mixed charge air and recirculated exhaust gas through the said first and second pipes and thereby said cooling passages in forward, bypass, and reverse flow paths.

6. An engine working fluid circuit as set forth in claim 2 further including an exhaust gas recirculation valve operatively disposed in said exhaust gas recirculation passage and acting to control the flow of exhaust gas from said exhaust gas passage into said charge air passage.

7. An engine working fluid circuit as set forth in claim 6 further including a venturi defined at the fluid connection between said charge air passage and said exhaust gas recirculation passage to assist in drawing flow from said exhaust gas recirculation passage into said charge air passage.

8. An engine working fluid circuit as set forth in claim 7 further including a pressure sensor disposed between said exhaust gas recirculation valve and said venturi and adapted to sense the flow of exhaust gas through said exhaust gas recirculation passage.

* * * * *